(12) United States Patent
MacKay et al.

(10) Patent No.: US 12,147,663 B2
(45) Date of Patent: Nov. 19, 2024

(54) COMPUTER DEVICE WITH IMPROVED TOUCH INTERFACE AND CORRESPONDING METHOD

(71) Applicant: Inria Institut National De Recherche En Informatique Et En Automatique, Le Chesnay (FR)

(72) Inventors: Wendy MacKay, Palaiseau (FR); Jessalyn Alvina, Palaiseau (FR)

(73) Assignee: INRIA INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 449 days.

(21) Appl. No.: 16/756,770

(22) PCT Filed: Oct. 18, 2018

(86) PCT No.: PCT/FR2018/052598
§ 371 (c)(1),
(2) Date: Jan. 19, 2021

(87) PCT Pub. No.: WO2019/077279
PCT Pub. Date: Apr. 25, 2019

(65) Prior Publication Data
US 2021/0141528 A1 May 13, 2021

(30) Foreign Application Priority Data
Oct. 20, 2017 (FR) ........................................ 1759911

(51) Int. Cl.
*G06F 3/04886* (2022.01)
*G06F 3/023* (2006.01)
*G06F 3/04883* (2022.01)

(52) U.S. Cl.
CPC ........ *G06F 3/04886* (2013.01); *G06F 3/0237* (2013.01); *G06F 3/04883* (2013.01)

(58) Field of Classification Search
None
See application file for complete search history.

(56) References Cited

U.S. PATENT DOCUMENTS

| 2004/0140956 | A1  | 7/2004 | Kushler et al. |
| 2011/0043472 | A1* | 2/2011 | Hada ................... G06F 3/04883 345/173 |

(Continued)

FOREIGN PATENT DOCUMENTS

| CN | 1761989 A   | 4/2006  |
| CN | 101601050 A | 12/2009 |

(Continued)

OTHER PUBLICATIONS

Alvina, et al, "CommandBoard: Creating a General-Purpose Command Gesture Input Space for Soft Keyboard," Proceedings of the 30th Annual ACM Symposium on User Interface Software and Technology, Oct. 22, 2017, p. 17-28.

(Continued)

*Primary Examiner* — Matthew Ell
*Assistant Examiner* — David V Luu
(74) *Attorney, Agent, or Firm* — David D. Brush; Westman, Champlin & Koehler, P.A.

(57) ABSTRACT

A computer device comprises a screen (6) capable of touch acquisition, and a processor (8) designed to control the display of a depiction of a keypad on a keypad portion (10) of the screen (6) and to determine textual input data when a touch input tool is moved over the keypad portion (10) of the screen (6). The processor (8) is furthermore designed, when a touch input tool is moved continuously over the screen (6), to detect the movement of the touch input tool from the (Continued)

keypad portion (10) to a control portion (12) of the screen (6), to detect the movement of the touch input tool into the control portion (12) and determine a system operation on the basis of this movement, and, if the continuous movement ends in the control portion (12), to execute the system operation.

16 Claims, 3 Drawing Sheets

(56) References Cited

U.S. PATENT DOCUMENTS

| | | |
|---|---|---|
| 2011/0122081 A1 | 5/2011 | Kushler |
| 2015/0007117 A1* | 1/2015 | Schultz ............... G06F 3/04883 715/863 |
| 2015/0121285 A1 | 4/2015 | Eleftheriou et al. |
| 2016/0062649 A1* | 3/2016 | Kristensson .......... G06F 40/274 715/256 |
| 2017/0097765 A1 | 6/2017 | Hsu-Kuang |
| 2018/0232137 A1* | 8/2018 | Ma ....................... G06F 3/04886 |
| 2022/0057932 A1* | 2/2022 | Kim ..................... G06F 3/04886 |

FOREIGN PATENT DOCUMENTS

| | | |
|---|---|---|
| EP | 2336852 A2 | 6/2011 |
| FR | 3072804 A1 | 4/2019 |
| WO | 2008133619 A2 | 11/2008 |
| WO | 2015087084 A1 | 6/2015 |
| WO | 2019/077279 A1 | 4/2019 |

OTHER PUBLICATIONS

Office Action received for European Patent Application No. 18812231.1, mailed on Nov. 16, 2021, 07 pages.
International Preliminary Report on Patentability received for International Patent Application No. PCT/FR2018/052598, mailed on Apr. 30, 2020, 17 pages including English translation.
International Search Report and Written Opinion received for International Patent Application No. PCT/FR2018/052598, mailed on Feb. 13, 2019, 22 pages including English translation.
First Search Report for Chinese Patent Application No. 201880081503.2, mailed Sep. 19, 2023, 2 Pages.
First Office Action for Chinese Patent Application No. 201880081503.2, mailed Sep. 19, 2023, 11 Pages including English translation.

\* cited by examiner

COMPUTER DEVICE WITH IMPROVED TOUCH INTERFACE AND CORRESPONDING METHOD

The invention relates to the field of touch input interfaces.

The last 15 years have seen extensive development in touch input interfaces for electronic devices. Text is input on these devices by means of a keypad displayed on the screen, the user pressing on the keys of the text that they wish to write.

This type of interaction being perceived by individuals in different ways due to the lack of physical return as in the case of a physical keyboard, software has been developed to favor more natural input in a touch context. These tool are also known as "gesture keyboards", and text is entered by continuously moving the finger on the interface from one letter to another of a word that the user wishes to enter. An algorithm analyzes the movement of the finger and is generally combined with a dictionary to determine the word sought.

These tools have been very quickly adopted by a large proportion of users. However, they can only be used for entering text. Any options associated with this text, such as formatting, but also the use of the text entered for something other than mere typing, for example for accessing system settings or functions, is completely impossible.

The invention improves the situation.

For this purpose, the invention relates to a computer device comprising a screen capable of touch sensing, and a processor designed to control the display of a representation of a keypad on a keypad portion of the screen and to determine text input data when a touch input tool is moved continuously over the keypad portion of the screen. The processor is furthermore designed, when a touch input tool is moved continuously over the screen, to detect the movement of the touch input tool from the keypad portion to a control portion of the screen, to detect the movement of the touch input tool into the control portion and determine a system operation on the basis of this movement, and, if the continuous movement ends in the control portion, to execute the system operation.

This device is particularly advantageous, as it enables use of the portion of the screen located above the keypad to enhance the touch input interface, and make it possible to activate complex functions which were previously only accessible by cascades of menus unsuited to the touch context and/or by a change of application rendering the user experience mediocre. Indeed, the user can input text in the keypad portion as they are accustomed to in "gesture keyboard" mode, and the additional function enables them, following on from the same gesture, to execute a system operation which may be designated by the text input in the keypad portion, or indeed be an operation applied to the text input in the keypad portion.

In various alternative embodiments, the device according to the invention may have one or more of the following features:

the processor is furthermore designed, when a touch input tool is moved continuously over the screen, to furthermore determine the system operation based on the text input data determined before transferring the continuous movement of the touch input tool from the keypad portion to the control portion, the processor is furthermore designed, when a touch input tool is moved continuously over the screen in the keypad portion, to determine a system operation based on determined text input data based on a movement of the touch input tool in the keypad portion, and, if the continuous movement ends in the control portion, to execute this system operation in response to the detection of a movement in the control portion associated with an execution system operation, the processor is furthermore designed, when a touch input tool is moved continuously over the screen in the keypad portion, to control the representation on the screen of a visual element associated with a system operation determined based on text input data determined on the basis of the movement of the touch input tool in the keypad portion, the processor is designed, after detecting the movement of the touch input tool from the keypad portion to the control portion of the screen and when the touch input tool is moved into the control portion, to detect this movement and to display a representation on the screen of a visual element associated with at least one system operation corresponding to this movement, and the processor is designed to determine that a movement detected in the control portion corresponds partially to a movement for determining a system operation, and wherein the processor is furthermore designed to display a text representation of the system operation which associated movement corresponds partially to the movement detected in the control portion and/or to display a representation of a remaining movement to be carried out to designate the system operation which associated movement corresponds partially to the movement detected in the control portion.

The invention also relates to a touch data input management method used by a computer having a display capable of touch sensing, comprising the following operations:

a) capturing text input data in a keypad portion of the screen, b) capturing movement data of a touch input tool, c) in response to the detection of a continuous movement of the touch input tool from the keypad portion to a control portion of the screen, c1) detecting the movement of the touch input tool in the control portion of the screen, c2) determining a system operation corresponding to the movement detected in operation c1), and, c3) if the continuous movement ends in the control portion, executing the system operation.

In various alternative embodiments, the device according to the invention may have one or more of the following features:

operation c2) further comprises determining the system operation based on text input data captured in operation a), operation c1) comprises the determination of text input data from a continuous movement of the touch input tool in the keypad portion, operation a) comprises the determination of text input data determined from the movement of the touch input tool in the keypad portion and the display on the screen of a visual element associated with a system operation determined based on the text input data, operation c2) comprises the display on the screen of a visual element associated with the system operation determined, operation c2) comprises the determination of one or more system operations corresponding to the movement of operation c1), and the display for at least some of this or these several system operations of the remaining movement(s) to be carried out to designate at least some of this or these several system operations, and operation c) comprises the display of a context portion in the control portion based on text input data from operation a).

Further features and advantages of the invention will emerge more clearly on reading the following description, based on examples given by way of illustration and not restriction, based on the drawings wherein.

The drawings and the description hereinafter contain, essentially, elements of a definite nature. Therefore, they may not only serve to make the present invention better understood, but also contribute to the definition thereof, where appropriate.

The present description is likely to involve elements that may be protected by royalties and/or copyright. The holder of the rights has no objection to the exact reproduction by whomsoever of the present patent document or of the description thereof, as it appears in the official files. For the remainder, it wholly reserves its rights.

Figure 1:
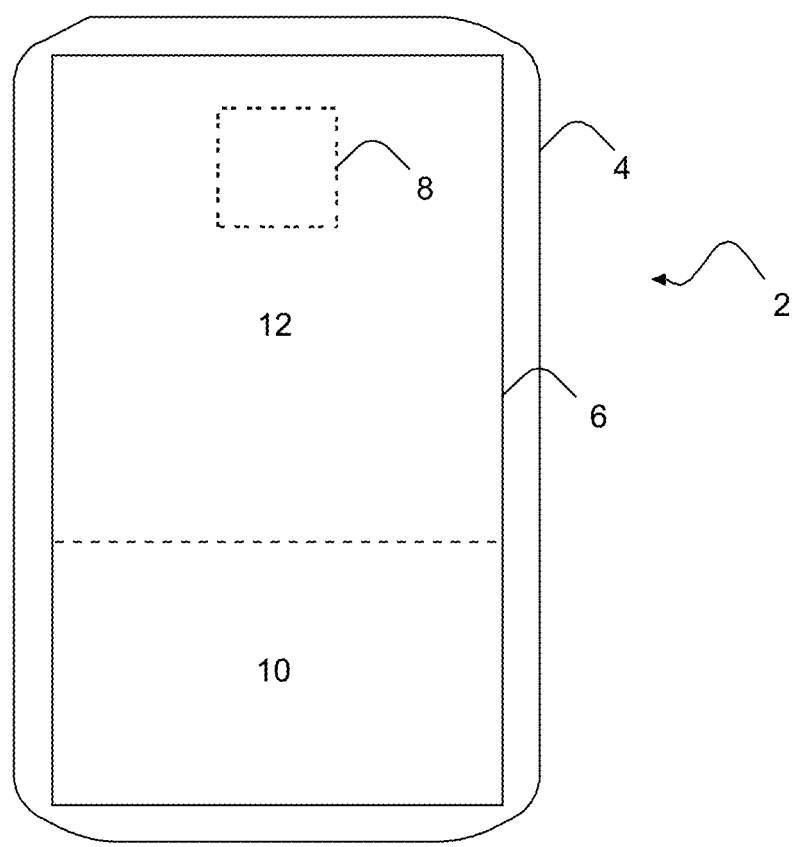
FIG. 1 represents a schematic view of a device according to the invention.

FIG. 1 represents a schematic view of a device 2 according to the invention. In the example described herein, the device 2 is a modern cellphone, also known as a smartphone.

In fact, the invention is applicable to any computer device that has a touch interface. These devices may therefore be computers, tablets, or combinations of these elements, for example a device combining a touch screen and a physical keyboard.

Thus, only the elements necessary for understanding the operation of the device 2 are represented in FIG. 1. The device 2 comprises a housing 4, a screen 6 and a processor 8.

The housing 4 may be of any type suitable for the devices described above, and of any known material for these devices, from metal to the different types of glass or indeed plastic.

The screen 6 may be of any type of screen (LED, AMOLED, OLED, etc.) equipped with touch sensing means (capacitive, resistive or other), such that any touch input tool, whether it be a finger or a stylus, can enter information by touching or skimming the screen 6.

On the screen 6, a dotted line has been added to depict a fundamental separation in the processing carried out by the device 2. Thus, the dotted line separates the screen 6 into a keypad portion 10 and a control portion 12. This separation is fundamental within the scope of the invention and represents the core of the operation of the device 2. Obviously, as the keypad is not physical, the separation between the keypad portion 10 and the control portion 12 may be moved depending on the display controlled by the processor 8.

Furthermore, the keypad portion 10 is herein depicted in the bottom part of the screen, as that is generally where the virtual keypad is displayed. Nevertheless, it is here again obvious that the keypad portion 10 could be in the top part of the screen and the control portion 12 in the bottom portion. In some embodiments, it could even be envisaged to have several keypad portions 10 and/or several control portions 12.

The processor 8 may be any processor or group of processors suitable for the operation of the device 2. According to the embodiments, the processor 8 may be a general-purpose processor, which executes an operating system implementing the invention. However, the processor 8 could also be a dedicated processor, or be implemented in the form of an FPGA, SoC, or any other suitable form.

Figure 2:
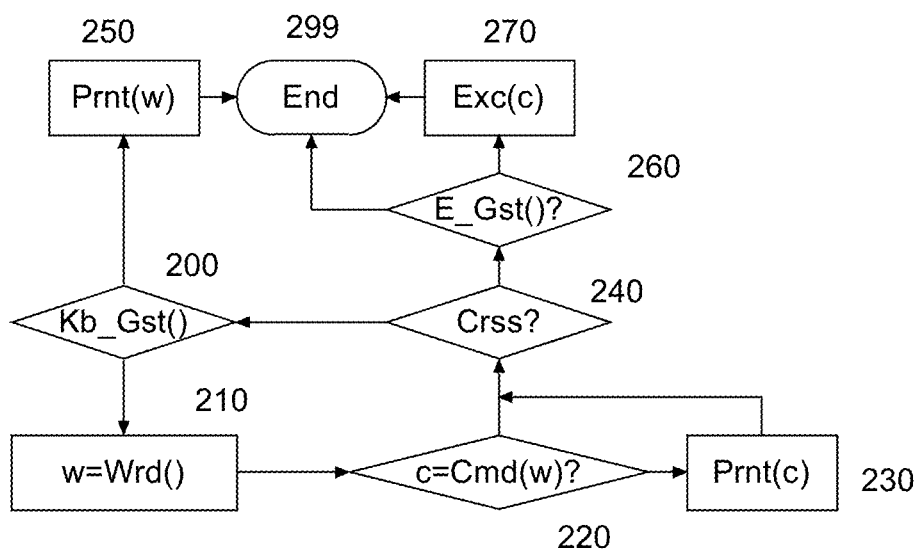
FIG. 2 represents an example of an embodiment of a function by the device in FIG. 1.
Figure 3:
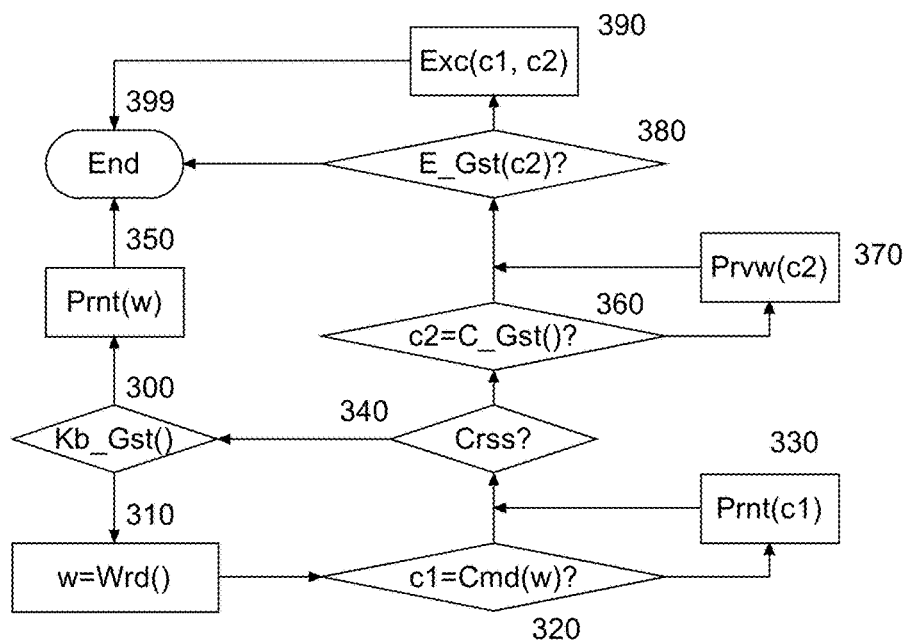
FIG. 3 represents a further example of an embodiment by the device in FIG. 1, and FIGS. 4 to 6 show practical examples of embodiments of the functions in FIGS. 2 and 3.

Although FIGS. 2 and 3 are presented in the form of a sequential diagram, it will be obvious that certain operations may be executed in parallel. Furthermore, hereinafter, the terms "command" and "system operation" may be used for one another.

FIG. 2 represents a first embodiment of a function implemented by the device 2. This embodiment introduces the more basic operation of the invention: the execution of commands.

To explain the principle, the user will enter a command in text input form in the keypad portion 10, and execute a particular gesture in the control portion 12 in order to request the execution of the command.

In this function, as in that of FIG. 3, an essential aspect is the continuity of the movement of the touch input tool on the touch surface. Indeed, while the movement is continuous, that is to say the touch input tool interacts with the screen 6, the movement is analyzed. When the touch input tool stops interacting with the screen 6, for example when the user lifts their finger, the movement ends, and the actions are interpreted by the processor 8 with a view to executing a system operation, or doing nothing.

The function starts with an operation 200 wherein a loop runs with touch data sensing, with a view to detecting a continuous movement in the keypad portion 10. When such a movement is detected, the word that is currently being entered by the user is detected in an operation 210, and an operation 220 determines whether this word corresponds to a command or system operation that is recognized in the context of the application wherein the function is executed. If this is the case, then the processor 8 displays a text associated with this command or system operation in the control portion 12 in an operation 230, for example the name of the command or an image or icon representing same. Thus, the user knows by looking at the control portion 12 that they have entered sufficient text to execute a given command. Alternatively, operations 220 and 230 could be omitted.

Then, a test is carried out in an operation 240 to determine whether the touch input tool has moved into the control portion 12. Indeed, when the user has finished entering the name of the command in the keypad portion 10 and wishes to execute same, they move the touch input tool into the control portion 12.

Otherwise, then operations 200 to 230 are repeated, until operation 240 returns a positive result, or the user interrupts the movement of the touch input tool. In the latter case, as operation 240 has always returned a negative result, the situation is a conventional one, wherein the user has entered a word via the keypad portion 10, and has finished entering this word. The word is therefore displayed in an operation 250, and the function ends in an operation 299.

If the user decides to execute a command, then they move the touch input tool into the control portion 12, and a new loop is executed.

In the embodiment in FIG. 2, the device 2 is simplified, and the only functionality of the control portion 12 is that of enabling the user to execute a system operation or to cancel the input. Also, in an operation 260, the processor 8 detects the end of the continuous movement (that is to say the user's finger or the stylus are no longer close to the screen) and analyzes the movement of the touch input tool in the control portion 12 in order to determine whether the latter corresponds to an "execution" type system operation. Within the scope of its research, the Applicant discovered that a vertical gesture followed by a downward gesture, at an acute angle on the right or on the left (which gives a shape of a handwritten digit 1 with no base, or the mirror thereof) is particularly intuitive for users. Therefore, this gesture was retained. If this movement is recognized by the processor 8, and if the word entered in the keypad portion 10 corresponds to an available command, then the processor 8 performs a system operation of executing this command, and the function ends with operation 299.

When operation 260 determines a gesture which does not correspond to this gesture, or the word entered in the keypad portion 10 does not correspond to any available command, then the input is cancelled and the word entered in the keypad portion is not displayed, and the function ends with operation 299. Thus, the control portion 12 may also serve to simply cancel an incorrect input.

Optionally, if the processor 8 detects that the touch input tool has moved to the control portion 12 and then returned to the keypad portion 10, the processor 8 may resume the loop of operations 200 to 240. Thus, if a user has "accidentally" moved to the keypad portion 10, their input is not lost.

Figure 4:
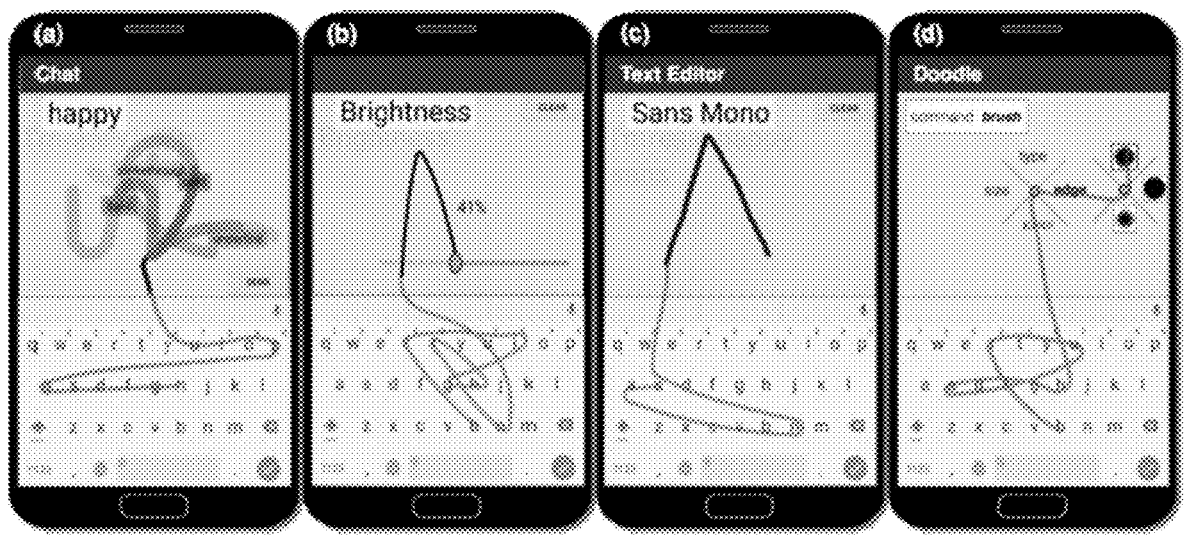

FIGS. 4*b*), 4*c*) and 5*a*) to 5*c*) represent an embodiment of this function.

In FIG. 4*b*), the user has entered the letters "brightn" (first letters of the word "brightness"). The processor 8 has determined in operation 230 that these letters correspond to a general system command which is used to adjust the brightness of the screen, and is accessible from any application, regardless of the context. Once the word has been entered in the keypad portion 10, and the "execution" gesture made in the control portion 12, a slide bar appears in the control portion 12 where the "execution" gesture stopped, and the user can adjust the brightness by sliding this bar. This type of application may be extended to a color wheel to select a font, to the insertion of a table, or any other widget type tool that can be invoked by the processor 8 when an "execution" type system operation is executed.

In FIG. 4*c*), in a text editor, the user has entered the word "sans". The processor 8 has displayed, as a possible command (operation 230), "Sans Mono" in the control portion 12. Thanks to this suggestion, the user has moved from the keypad portion 10 into the control portion 12, has made the "execution" gesture, which has activated the change of the text font to "Sans Mono". In this case, the processor 8 has determined that the only command containing the word "sans" was to change the font to "Sans Mono". Alternatively, the processor 8 could have suggested "Sans Mono" in the keypad portion 10 as predictive text, and the user could have specified this word with this predictive text before moving to the control portion 12.

Figure 5:
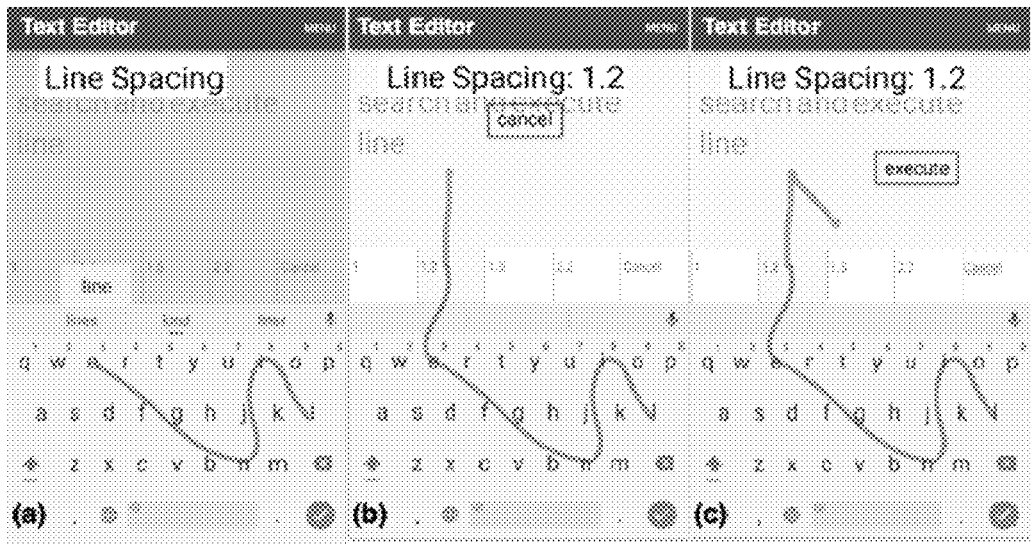

FIGS. 5*a*) to 5*c*) represent a particularly powerful alternative embodiment of the "execution" command. Some commands, such as the font size or line spacing need to invoke more than merely the command name, it is also necessary to invoke a corresponding number.

In order to simplify the use of these commands, the invention envisages alternatively that the control portion 12 may envisage an option bar located just above the keypad portion 10, and which enables the user to specify a parameter for a command.

For example in FIG. 5*a*), in a text editor, the user has typed the word "line". The processor 8 has displayed, as a possible command (operation 230), "Line Spacing" in the control portion 12. As can be seen in FIG. 5*b*), once operation 230 has identified the "Line Spacing" command, the processor 8 has displayed the option bar just above the keypad portion 10 (herein, just above the part of the keyboard portion 10 allocated for predictive input). The user moves through the portion of the option bar corresponding to the line spacing value to be applied, and, as can be seen in FIG. 5*c*), executes the change of line spacing by carrying out the "execution" gesture as a continuation of their movement.

FIG. 3 proposes an even more enhanced embodiment of the control portion 12. In this embodiment, the user can still use the control portion 12 to execute a system operation or cancel an input, but they can furthermore execute other gestures according to the context.

Thus, operations 300 to 350 are identical to operations 200 to 250. The differences are essentially found in the management of the control portion 12. Once the processor 8 has detected the movement of the touch input tool into the control portion 12, it proceeds as above by detecting and analyzing the movement of the touch input tool.

However, in this embodiment, the system operation to be executed may not be designated by the word entered in the keypad portion 10, but on the contrary relate thereto. Thus, in two operations 360 to 370 similar to operations 320 to 330, the processor 8 analyzes whether the movement of the touch input tool in the control portion 12 corresponds to a gesture triggering the execution of a system operation, and, where appropriate, displays a representation thereof in the control portion 12. Thus, a user may see that a gesture made in the control portion 12 will have a particular effect on the word entered in the keypad portion 10. Alternatively, the gesture made in the control portion 12 may serve to specify a parameter of a command the name whereof has been entered in the keypad portion 10.

Operation 370 may be rendered particularly effective by depicting in the control portion 12 all the gestures that can be made according to the movement already carried out in the control portion 12. Thus, a user searching for a command may be guided in the gesture to be made. Furthermore, the user may take a slight break at the start of the input in the control portion 12 to view the options available. These operations are useful to show a user the accessible system operations, and offer them feedback on their actions. Nevertheless, they could be omitted.

In an operation 380, similar to operation 260, the processor 8 detects the end of the continuous movement of the touch input tool, and analyzes the movement in the control portion 12 to determine whether it corresponds to an executable command. As seen with FIG. 4*d*), the concept of executable command may be very closely linked with the interaction in the control portion 12, and not be linked with a specific gesture.

When the processor determines that the movement of the touch input tool in the control portion 12 corresponds to an "execution" type system operation, to another command applied to the text entered in the keypad portion 10 or to another command, this is carried out in an operation 390, and the function then ends in operation 399. Otherwise, the function ends directly in operation 399.

FIGS. 4*a*), 4*d*) and 6 make it possible to understand the novel possibilities offered by the embodiment of FIG. 3 more particularly.

Thus, in FIG. 4*a*), in a text editor or a chat application, the user has typed the word "happy", and has moved to the control portion 12. On moving to the control portion 12, operation 370 enables the display of the gestures available and the associated commands, and the display thereof enables the user to ascertain which part of the gesture remains to be made. Thus, the formatting of the word that has been entered in the keypad portion 10 is greatly simplified. It will be noted that this formatting may be absolute in the context of a text editor, that it to say the command executed by the processor 8 will be "change the style of the word happy to bold" or via the addition of tags as is the case in chat applications, that is to say the command executed by the processor 8 will be "add tags around the word happy so that the word is displayed in bold in the application".

FIG. 4d) shows a particularly interesting example of interaction in the control portion 12. Herein, the application is a doodle application. To change the brush style used, the user has typed "brush" in the keypad portion 10, and has moved to the control portion 12. During the movement, the processor 8 has displayed an X-shaped menu enabling the user to select a function. On moving through the "edge" selection, the processor 8 has completed the possible choices for the brush edge format. Thus, not only is a gesture detected herein, but a gestural interaction is triggered in the control portion 12. This makes it possible to offer the equivalent of browsing through drop-down menus, but with an experience that is much more comfortable and compatible with a touch screen.

Figure 6:
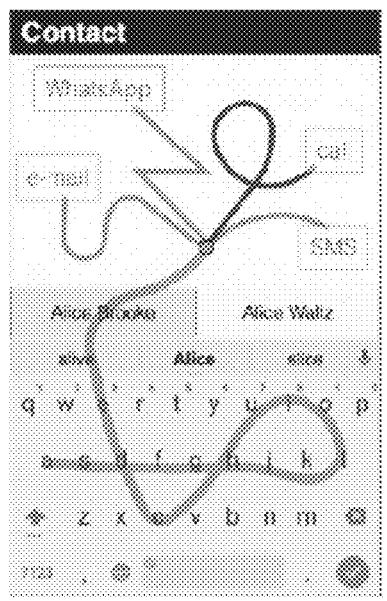

FIG. 6 represents another scenario where the context renders the device according to the invention extremely powerful. In the "Contacts" application, a user has typed the first name "Alice". The processor 8 has then displayed, in the option bar of the control portion 12, two names of contacts comprising the first name "Alice": "Alice Brooke" and "Alice Waltz". On moving into the control portion 12, the user has selected one of the two first names, and operation 370 indicates which gestures are available to call, send a message, an email, start a conversation in a chat application, etc.

Obviously, the gestures available in the different contexts may be entirely configurable. Thus, some gestures may be limited to certain applications, or, on the contrary, be available in all contexts. Furthermore, it is possible to allow the user to configure all the gestures, so that they select the gestures most relevant to them. It will also be possible to use the control portion 12 to insert automatic expressions. For example, a user may, after having entered a word in the keypad portion 10, make a gesture in the control portion 12 to automatically add an expression such as an emoji, or an expression such as "XOXO", or any other expression used regularly and for which the user is seeking a shortcut.

These favorite expressions may also be recorded by means of the control portion 12, for example by offering a gesture which is a system operation of the type "add gestural shortcut". In the examples above, the input in the keypad portion 10 has been described on the basis of a "gesture keyboard" type keyboard. Nevertheless, it is compatible with conventional input, provided that at the end of typing a word, a continuous movement is made from the keypad portion 10 to the control portion 12. Finally, the system operations may be interaction commands with other devices, for example to control same in the manner of a remote control.

The embodiments and examples described above are entirely combinable with one another. Also, if a feature has been described in relation to a single example or a single embodiment, it should be understood that it can be applied to another example or embodiment provided that it is not clearly incompatible therewith.

The invention claimed is:

1. A touch input management method used by an electronic device having a screen capable of touch sensing and showing, under control of a processor of the electronic device, a separation between a keypad portion of the screen and a portion of the screen for gesture based command triggering, the method comprising:
   capturing a text input in the keypad portion of the screen,
   capturing a touch input movement from the screen,
   responsive to the touch input movement crossing the separation, determining a computer executable instruction based on said text input as captured at the moment of said crossing, and
   if a further continuous touch input movement in the portion of the screen for triggering commands matches a user gesture preassociated in the electronic device with a triggering command for one specific kind of the computer executable instruction, executing said specific kind of the computer executable instruction.

2. The method according to claim 1, wherein capturing text input comprises capturing a touch input continuous movement in the keypad portion.

3. The method according to claim 1, further comprising an early determination of a suggested specific kind of the computer executable instruction corresponding to a detected partial touch input movement in the portion of the screen for triggering commands, and displaying on the screen a suggested remaining movement to be carried out to match a predetermined complete movement preassociated in the electronic device with said specific kind of the computer executable instruction.

4. The method according to claim 1, further comprising displaying, based on the captured text input, contextual information in a further portion of the screen comprised in the portion of the screen for triggering commands.

5. The method according to claim 1, wherein the portion of the screen for triggering commands is above the keypad portion on a rectangular screen in portrait mode.

6. The method according to claim 1, wherein executing said specific kind of the computer executable instruction is performed conditionally upon the continuous movement ending in the portion of the screen for triggering commands.

7. The method according to claim 1, wherein the specific kind of the computer executable instruction comprises a text format modification command or a screen brightness adjustment command or an electronic message preparation command.

8. The method according to claim 1, wherein the separation is moved by the processor of the electronic device.

9. An electronic device comprising:
   a screen capable of touch sensing and showing a separation between a keypad portion of the screen and a portion of the screen for gesture based command triggering, and
   a processor to control a display of a representation of a keypad on the keypad portion of the screen and to determine a text input upon touch input sensing of a continuous movement over the keypad portion of the screen,
   wherein the processor furthermore detects an exit of the touch input tool from the keypad portion upon a crossing of the separation, and responsive to the touch movement crossing the separation determines a computer executable instruction based on said text input as captured at the moment of said crossing, and analyzes if a further continuous touch input movement in the portion of the screen for triggering commands matches a predetermined user gesture preassociated, in the electronic device, with a triggering command for one specific kind of the computer executable instruction, and if so executes the specific kind of the computer executable instruction.

10. The electronic device according to claim 9, wherein the processor furthermore executes the specific kind of the computer executable instruction if the text input determined upon sensing of a touch input tool moving continuously over the keypad portion of the screen before crossing the separation to the portion of the screen for triggering commands is presassociated in the electronic device with the specific kind of the computer executable instruction.

11. The electronic device according to claim 9, wherein the processor further, when the touch input tool is moved continuously over the screen in the keypad portion, controls the representation on the screen of a visual element associated with a computer executable instruction determined according to text input determined based on the movement of the touch input tool in the keypad portion.

12. The electronic device according to claim 9, wherein the processor proceeds to a determination that a movement detected in the portion of the screen for triggering commands corresponds partially to a movement for determining the specific kind of the computer executable instruction, and responsive to said determination, displays a text representation of the specific kind of the computer executable instruction or a graphic representation of a remaining movement to be carried out to finish designating the specific kind of the computer executable instruction.

13. The electronic device according to claim 9, wherein the portion of the screen for triggering commands is a control portion.

14. The electronic device of claim 9, wherein the electronic device is a smartphone.

15. The electronic device according to claim 9, wherein said specific kind of the computer executable instruction is executed if and only if the continuous movement ends in the portion of the screen for triggering commands.

16. The electronic device according to claim 9, wherein the separation is moved by the processor of the electronic device.

\* \* \* \* \*